US009237322B2

(12) United States Patent
Chiu et al.

(10) Patent No.: US 9,237,322 B2
(45) Date of Patent: Jan. 12, 2016

(54) SYSTEMS AND METHODS FOR PERFORMING SELECTIVE VIDEO RENDERING

(71) Applicant: Cyberlink Corp., Shindian, Taipei (TW)

(72) Inventors: Chieh-Chin Chiu, New Taipei (TW); Shiang-Yang Huang, New Taipei (TW)

(73) Assignee: CYBERLINK CORP., Taipei (TW)

( * ) Notice: Subject to any disclaimer, the term of this patent is extended or adjusted under 35 U.S.C. 154(b) by 217 days.

(21) Appl. No.: 13/762,158

(22) Filed: Feb. 7, 2013

(65) Prior Publication Data

US 2014/0219633 A1  Aug. 7, 2014

(51) Int. Cl.
*H04N 5/93* (2006.01)
*G11B 27/00* (2006.01)
*H04N 9/87* (2006.01)
*G11B 27/031* (2006.01)

(52) U.S. Cl.
CPC .............. *H04N 9/87* (2013.01); *G11B 27/031* (2013.01)

(58) Field of Classification Search
CPC .............. H04N 9/8042; G11B 27/034; G11B 2220/90; G11B 27/34; G11B 27/105; G11B 27/024; G11B 27/032; G11B 27/029; G11B 27/329; G11B 2220/20
USPC .................................................. 386/278–290
See application file for complete search history.

(56) References Cited

U.S. PATENT DOCUMENTS

| | | |
|---|---|---|
| 5,682,326 A | 10/1997 | Klingler et al. |
| 6,377,518 B1 * | 4/2002 | Auwens et al. ............ 369/30.04 |
| 7,689,062 B2 | 3/2010 | Baharav et al. |
| 7,970,049 B2 | 6/2011 | Smith |
| 2006/0233237 A1 | 10/2006 | Lu et al. |
| 2006/0253857 A1 | 11/2006 | Wu et al. |

(Continued)

FOREIGN PATENT DOCUMENTS

| | | |
|---|---|---|
| GB | 2335125 A | 9/1999 |
| JP | 2005142901 A | 6/2005 |
| WO | 2010045736 A1 | 4/2010 |

OTHER PUBLICATIONS

Honestech Video Editor 7.0 User Guide, 2006.

(Continued)

*Primary Examiner* — Nigar Chowdhury
(74) *Attorney, Agent, or Firm* — McClure, Qualey & Rodack, LLP

(57) ABSTRACT

Various embodiments are disclosed for facilitating selective rendering during video editing. In accordance with one embodiment, a method of editing video comprises obtaining a video editing project, the video editing project including at least one video clip and timing information corresponding to the at least one video clip. The method further comprises obtaining a reference file generated according to the video editing project and obtaining, from a user, a modification for at least one segment in the video editing project. Based on the modification, each of the at least one segment is identified as a modified segment or an unmodified segment. Based on the identification of at least one modified segment, at least one corresponding segment is extracted from the reference file. The method further comprises applying the modification to the extracted at least one corresponding segment from the reference file, rendering only the extracted at least one corresponding segment, and combining the at least one rendered segment with a remaining portion of the reference file to generate an output file.

9 Claims, 10 Drawing Sheets

(56) References Cited

U.S. PATENT DOCUMENTS

| | | | |
|---|---|---|---|
| 2010/0021127 A1* | 1/2010 | Saito | 386/54 |
| 2010/0260468 A1* | 10/2010 | Khatib et al. | 386/52 |
| 2010/0262710 A1 | 10/2010 | Khatib et al. | |
| 2011/0194839 A1* | 8/2011 | Gebert et al. | 386/290 |
| 2012/0213497 A1* | 8/2012 | Lou et al. | 386/343 |
| 2012/0315020 A1* | 12/2012 | Fiumi | 386/278 |
| 2013/0016954 A1* | 1/2013 | Watanabe et al. | 386/230 |

OTHER PUBLICATIONS

How to Edit H.264/AVCHD/MPEG2 with Smart Rendering, FameRing Co. Ltd., 2008-2009.

MPEG Video Wizard DVD 5.0, Womble Multimedia Inc.

Final Cut Pro 7 User Manual, pp. 609-618; 1461-1490; Apple Inc., 2010.

* cited by examiner

SYSTEMS AND METHODS FOR PERFORMING SELECTIVE VIDEO RENDERING

TECHNICAL FIELD

The present disclosure generally relates to video processing, and more particularly, to a system and method for selectively rendering portions of a video.

BACKGROUND

Over the years, digital content has gained increasing popularity with consumers. With the ever-growing amount of digital content available to consumers through the Internet using computers, smart phones, and other sources, consumers have access to a vast amount of content. Furthermore, many devices (e.g., smartphones) and services are readily available that allow consumers to capture and generate video content.

Off-the-shelf video editing applications provide users with the capability to incorporate special effects into captured images, audio and video. Some video editing/playback applications allow users to incorporate comments and tags at specific points within the video. However, the video editing process can be a time-consuming task, particularly when videos are rendered every time the user elects to edit the video. Video editing applications typically employ various compression techniques to reduce the amount of storage space that a digital video requires. However, even in a compressed format, significant processing time is required during the rendering and re-rendering processes in order to incorporate special effects into a digital video.

SUMMARY

Briefly described, one embodiment, among others, is a method that comprises obtaining video content, generating a reference video comprising a copy of the video content, and obtaining a modification for at least one segment in the video content. Based on the modification, each of the at least one segment is identified as a modified segment or an unmodified segment, and based on the identification of at least one modified segment, at least one corresponding segment is extracted from the reference video. The method further comprises applying the modification to the extracted at least one corresponding segment from the reference video, rendering only the extracted at least one corresponding segment, and combining the at least one rendered segment with a remaining portion of the reference video to generate an output file.

Another embodiment is a video editing system that comprises a media interface configured to obtain a video editing project, the video editing project including at least one video clip and timing information corresponding to the at least one video clip. The system further comprises a file generator configured to obtain a reference file generated according to the video editing project and an editor configured to obtain a modification from a user for at least one segment in the project via a user interface, wherein the editor is further configured to identify each of the at least one segment as a modified segment or an unmodified segment based on the modification. The system further comprises a render engine configured to selectively render at least a portion of the reference file based on the at least one segment identified as a modified segment Another embodiment is a method of editing a video that comprises obtaining a video editing project, the video editing project including at least one video clip and timing information corresponding to the at least one video clip and obtaining a reference file generated according to the video editing project. The method further comprises obtaining modifications from a user for a plurality of segments in the video content, wherein the modifications are re-ordering of segments. The method further comprises identifying each of the segments as re-ordered segments in response to the re-ordering modifications, and the remaining segments as unmodified segments and combining the re-ordered segments and unmodified segments according to corresponding timing information to generate an output file without re-rendering the segments.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

With existing systems, the editing or modification of video content typically requires the video content to be rendered. The user may then view the rendered video content and incorporate additional modifications if desired. However, this typically requires the entire video to be re-rendered, thereby consuming valuable resources on the system. Furthermore, this can be a time-consuming process.

Various embodiments are disclosed for selectively re-rendering portions of a previously-rendered video, where the portions are modified by a user. Through the use of a reference video, a user may incorporate special effects and other modifications to a target video. The timing information associated with the modifications specified by the user is captured, and the same modifications are incorporated into the reference video. Only portions of the reference file are re-rendered. An output file is generated that comprises the re-rendered portions and any remaining portion of the reference file.

In this regard, one embodiment, among others, comprises a method for editing a video that comprises obtaining video content and generating a reference video comprising a copy of the video content. Modifications for at least one segment in the video content are obtained, and based on the modifications, at least one segment may be identified as a modified segment or an unmodified segment. The method further comprises extracting at least one corresponding segment from the reference video based on the at least one modified segment and applying the modifications to the extracted at least one corresponding segment from the reference video. The method further comprises rendering only the extracted one or more corresponding segments and combining the rendered segment with a remaining portion of the reference video to generate an output file.

Figure 1A:
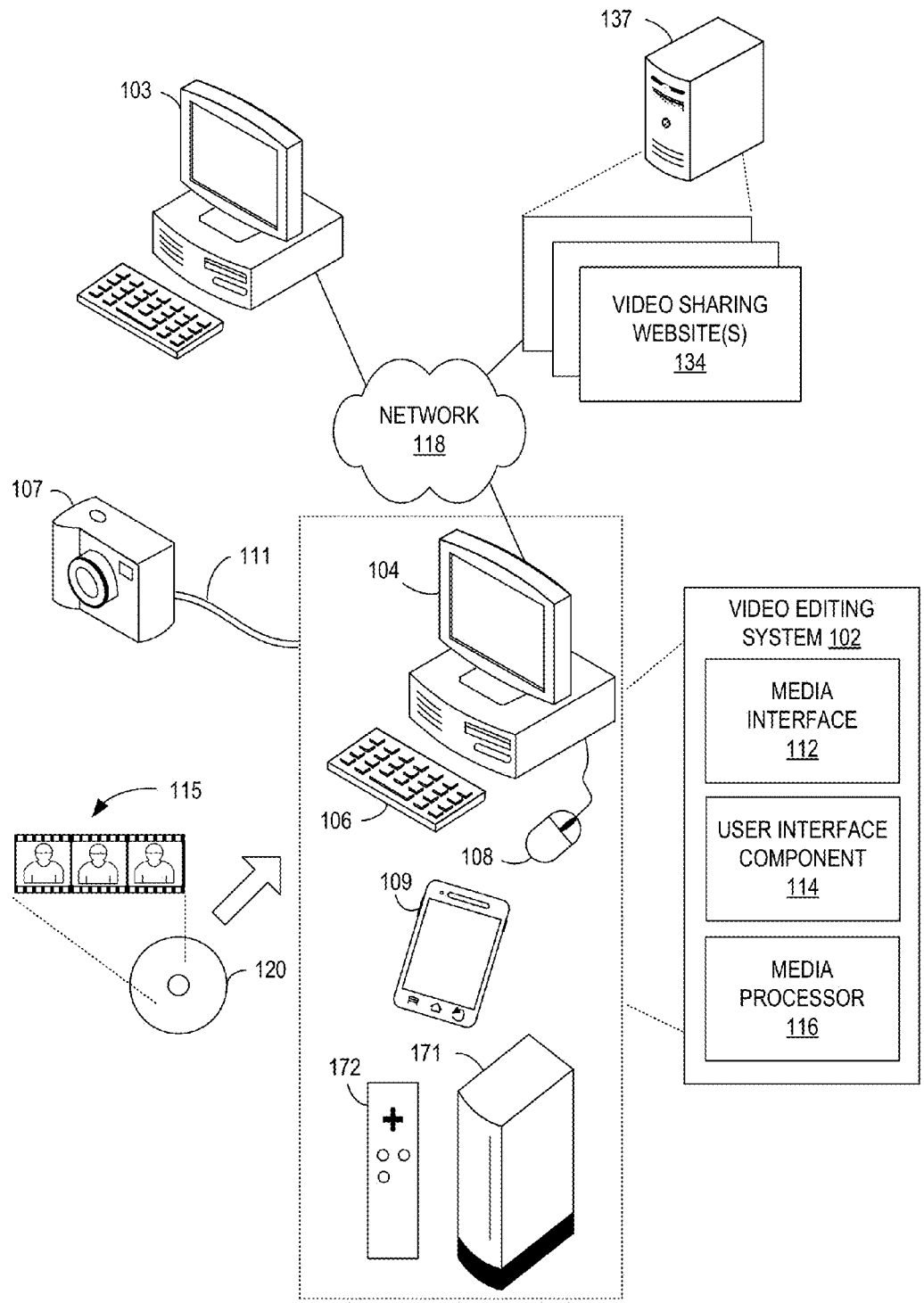
FIG. 1A is a block diagram of a video editing system for facilitating selective rendering during video editing in accordance with various embodiments of the present disclosure.

A description of a system for facilitating selective rendering during video editing through selective rendering of video is now described followed by a discussion of the operation of the components within the system. FIG. 1A is a block diagram of a video editing system 102 in which embodiments of the video rendering techniques disclosed herein may be implemented. The video editing system 102 may be embodied, for example, as a desktop computer, computer workstation, laptop, a smartphone 109, a tablet, or other computing platform that includes a display 104 and may include such input devices as a keyboard 106 and a mouse 108.

For embodiments where the video editing system 102 is embodied as a smartphone 109 or tablet, the user may interface with the video editing system 102 via a touchscreen interface (not shown). In other embodiments, the video editing system 102 may be embodied as a video gaming console 171, which includes a video game controller 172 for receiving user preferences. For such embodiments, the video gaming console 171 may be connected to a television (not shown) or other display 104.

The video editing system 102 is configured to retrieve, via the media interface 112, digital media content 115 stored on a storage medium 120 such as, by way of example and without limitation, a compact disc (CD) or a universal serial bus (USB) flash drive, wherein the digital media content 115 may then be stored locally on a hard drive of the video editing system 102. As one of ordinary skill will appreciate, the digital media content 115 may be encoded in any of a number of formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

As depicted in FIG. 1A, the media interface 112 in the video editing system 102 may also be configured to retrieve digital media content 115 directly from a digital camera 107 where a cable 111 or some other interface may be used for coupling the digital camera 107 to the video editing system 102. The video editing system 102 may support any one of a number of common computer interfaces, such as, but not limited to IEEE-1394 High Performance Serial Bus (Firewire), USB, a serial connection, and a parallel connection.

The digital camera 107 may also be coupled to the video editing system 102 over a wireless connection or other communication path. The video editing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the video editing system 102 may receive digital media content 115 from another computing system 103. Alternatively, the video editing system 102 may access one or more video sharing websites 134 hosted on a server 137 via the network 118 to retrieve digital media content 115.

The user interface component 114 in the video editing system 102 is configured to generate a user interface for obtaining one or more modifications for the media content 115 obtained by the media interface 112. As described in connection with the figures that follow, for some embodiments, the user interface may include a timeline component in addition to special effects components that allow a user to control playback of the media content 115 and insert special effects into the media content 115. The special effects may comprise, for example, the insertion of text, graphics, audio/video content from another file, and so on.

Figure 1B:
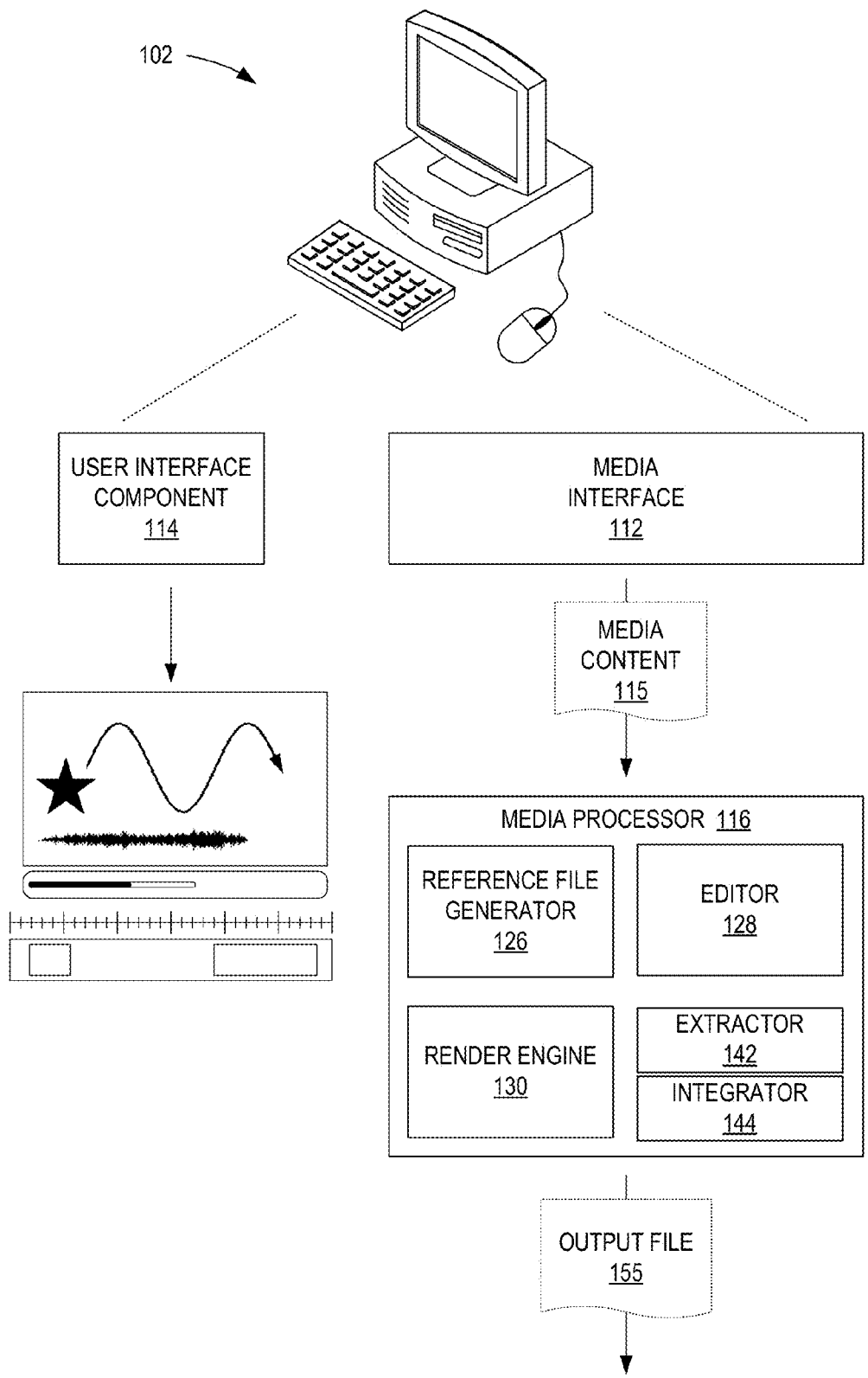
FIG. 1B is a block diagram of the media processor in the video editing system of FIG. 1A for facilitating selective rendering during video editing in accordance with various embodiments of the present disclosure.

The media processor 116 is configured to process the modifications specified by the user via the user interface and synchronize the modifications with a reference file comprising a copy of the media content 115 being modified. Reference is made to FIG. 1B, which illustrates various components of the media processor 116 in FIG. 1A. As shown, the media processor 116 further comprises a reference file generator 126, an editor 128, a render engine 130, an extractor 142, and an integrator 144.

The reference file generator 126 in the media processor 116 is configured to create a reference file comprising a copy of the media content 115 (FIG. 1A) being edited. For some embodiments, the reference file is hidden to the user during the editing process and is made available to the user in the form of an output file 155 when the selective re-rendering process is completed, where the output file 155 comprises both newly rendered segments and previously-rendered segments. For some embodiments, the reference file generator 126 is configured to generate a reference file every time a rendering operation is performed and an output file 155 is generated.

The editor 128 is configured to obtain one or more modifications for at least one segment in the media content 115 via a user interface generated by the user interface component 114 (FIG. 1A). For some embodiments, the editor 128 is further configured to identify each of the segments as either a modified segment or an unmodified segment based on the type of modification specified by the user. For example, the editor 128 may identify segments with modifications comprising the insertion of special effects (e.g., insertion of text, audio, video) as modified segments, whereas the editor 128 may identify segments that are merely re-ordered within the media content 115 as unmodified segments.

The extractor 142 is configured to extract corresponding segments from the reference video based on segments in the media content 115 identified as modified segments. Upon extraction of segments from the reference video, the editor 128 applies the one or more modifications specified by the user to the extracted segments in the reference file.

The render engine 130 is configured to selectively render portions of the reference file rather than the entire reference file, assuming that modifications are not being applied to the entire reference file. For some embodiments, the render engine 130 only renders the extracted segments corresponding to segments in the media content 115 that were identified as modified segments. Notably, all the remaining segments in the reference file are not re-rendered, thereby reducing the time and resources needed during the rendering process.

The integrator 144 is configured to combine the selectively rendered segments with the remaining segments in the reference file that were not re-rendered in order to generate an output file 155. The output file 155 therefore comprises both re-rendered segments and previously-rendered segments, where the re-rendered segments have been modified by the editor 128 according to the modifications specified by the user.

Figure 2:
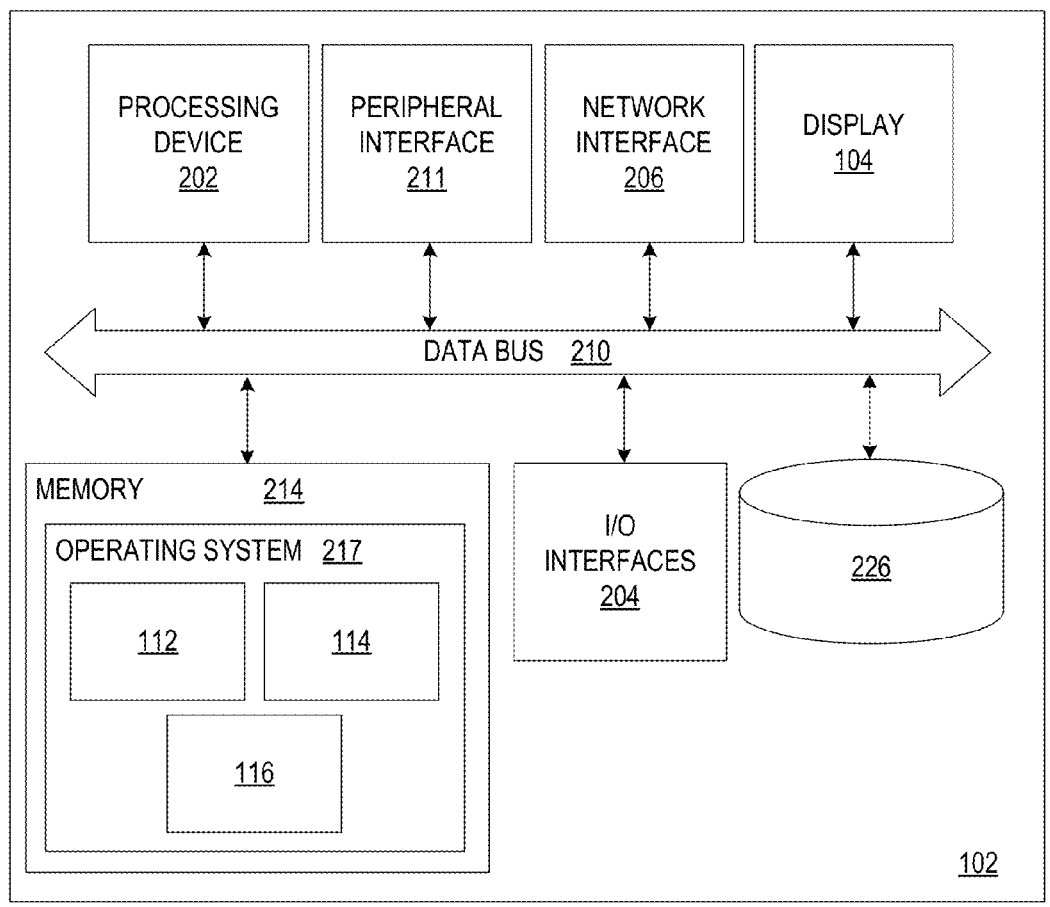
FIG. 2 is a detailed view of the video editing system device of FIG. 1A in accordance with various embodiments of the present disclosure.

FIG. 2 is a schematic diagram of the video editing system 102 shown in FIG. 1A. The video editing system 102 may be embodied in any one of a wide variety of wired and/or wireless computing devices, such as a desktop computer, portable computer, dedicated server computer, multiprocessor computing device, smartphone 109 (FIG. 1A), tablet computing device, and so forth. As shown in FIG. 2, the video editing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the video editing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (media interface 112, user interface component 114, media processor 116) of the video editing system 102 depicted in FIG. 1A. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the video editing system 102 comprises a personal computer, these components may interface with one or more user input devices via the I/O interfaces 204, where the user input devices may comprise a keyboard 106 (FIG. 1A) or a mouse 108 (FIG. 1A). The display 104 may comprise a computer monitor, a plasma screen for a PC, a liquid crystal display (LCD), a touchscreen display, or other display device 104.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The video editing system 102 may communicate with one or more computing devices via the network interface 206 over the network 118 (FIG. 1A). The video editing system 102 may further comprise mass storage 226. The peripheral interface 211 supports various interfaces including, but not limited to IEEE-1294 High Performance Serial Bus (Firewire), USB, a serial connection, and a parallel connection.

Figure 3:
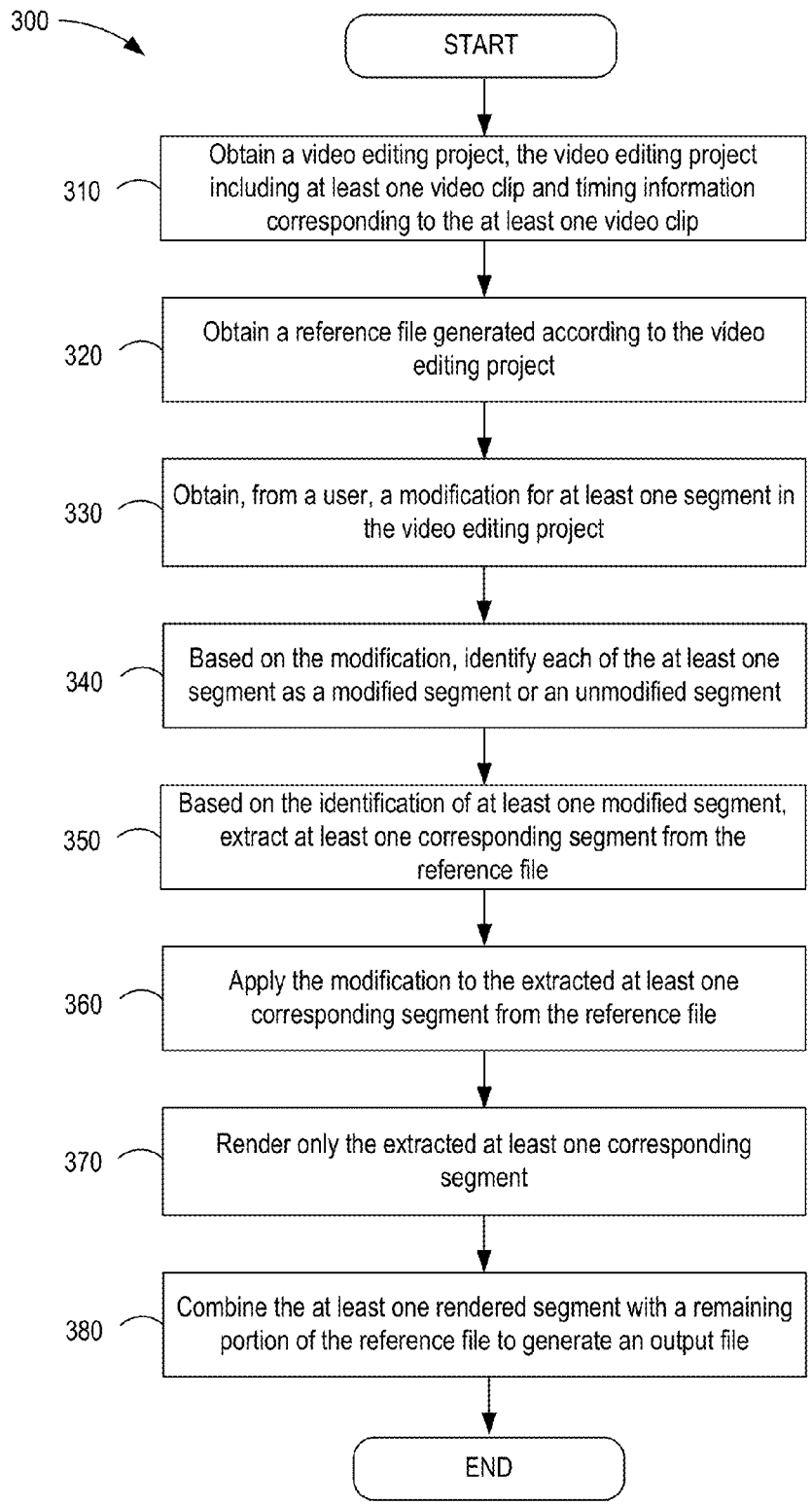
FIG. 3 is a top-level flowchart illustrating examples of functionality implemented as portions of the video editing system of FIG. 1A for facilitating selective rendering during video editing according to various embodiments of the present disclosure.

Reference is made to FIG. 3, which is a flowchart 300 in accordance with one embodiment for facilitating selective rendering of video content performed by the video editing system 102 of FIG. 1A. It is understood that the flowchart 300 of FIG. 3 provides merely an example of the many different types of functional arrangements that may be employed to implement the operation of the various components of the video editing system 102 (FIG. 1A). As an alternative, the flowchart of FIG. 3 may be viewed as depicting an example of steps of a method implemented in the video editing system 102 according to one or more embodiments.

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

Beginning with block 310, the media processor 116 (FIG. 1A) obtains a video editing project, the video editing project including at least one video clip and timing information corresponding to the at least one video clip.

In block 320, the reference file generator 126 (FIG. 1B) in the media processor 116 (FIG. 1A) generates a reference video according to the video editing project. For some embodiments, the reference video is hidden from the user. In block 330, the editor 128 (FIG. 1B) obtains, from a user, a modification for at least one segment in the video editing project, where the modification may comprise, for example, the insertion of text, video, audio, etc. into the media content 115.

In block 340, the editor 128 identifies each of the at least one segment as a modified segment or an unmodified segment based on the type of modification specified by the user. For example, segments within the media content 115 that are merely re-ordered or re-positioned may be identified as unmodified segments, whereas segments that incorporate additional content (e.g., text, graphics) may be identified as modified segments.

In block 350, the extractor 142 (FIG. 1B) extracts the corresponding segments from the reference video based on the identification of at least one modified segment. In block 360, the editor 128 applies the modification to the extracted at least one corresponding segment from the reference file. In block 370, the render engine 130 (FIG. 1B) renders only the extracted segments while the unmodified segments in the reference video are not rendered. In block 380, the integrator 144 (FIG. 1B) combines the rendered segments with the remaining segments in the reference video to generate an output file 155 (FIG. 1B).

To further illustrate the various concepts disclosed relating to selective rendering of segments, reference is made to FIGS. 4-7, which illustrate various aspects of selective rendering in accordance with various embodiments of the present disclosure. Shown in FIG. 4A is an example of a user interface (UI) 402 generated by the user interface component 114 (FIG. 1A) for obtaining modifications from a user for media content 115 (FIG. 1A). For the example shown, the UI 402 may comprise a viewing window and controls for controlling playback of the media content 115. As shown, the UI 402 may further comprise a timeline component corresponding to playback of the media content 115. The timeline component may also be utilized by the user to jump to a particular location in the media content 115.

The UI 402 may also include an effects bar that the user may utilize to incorporate special effects into the media content 115. In the example shown, the user may use the effects bar to insert graphics, text, and/or audio/video content from another file, where each special effect has an associated graphic thumbnail 405, 406, 408 and where the duration of each thumbnail 405, 406, 408 corresponds to the starting time and time duration in which the special effect is applied to the media content 115.

Figure 4A:
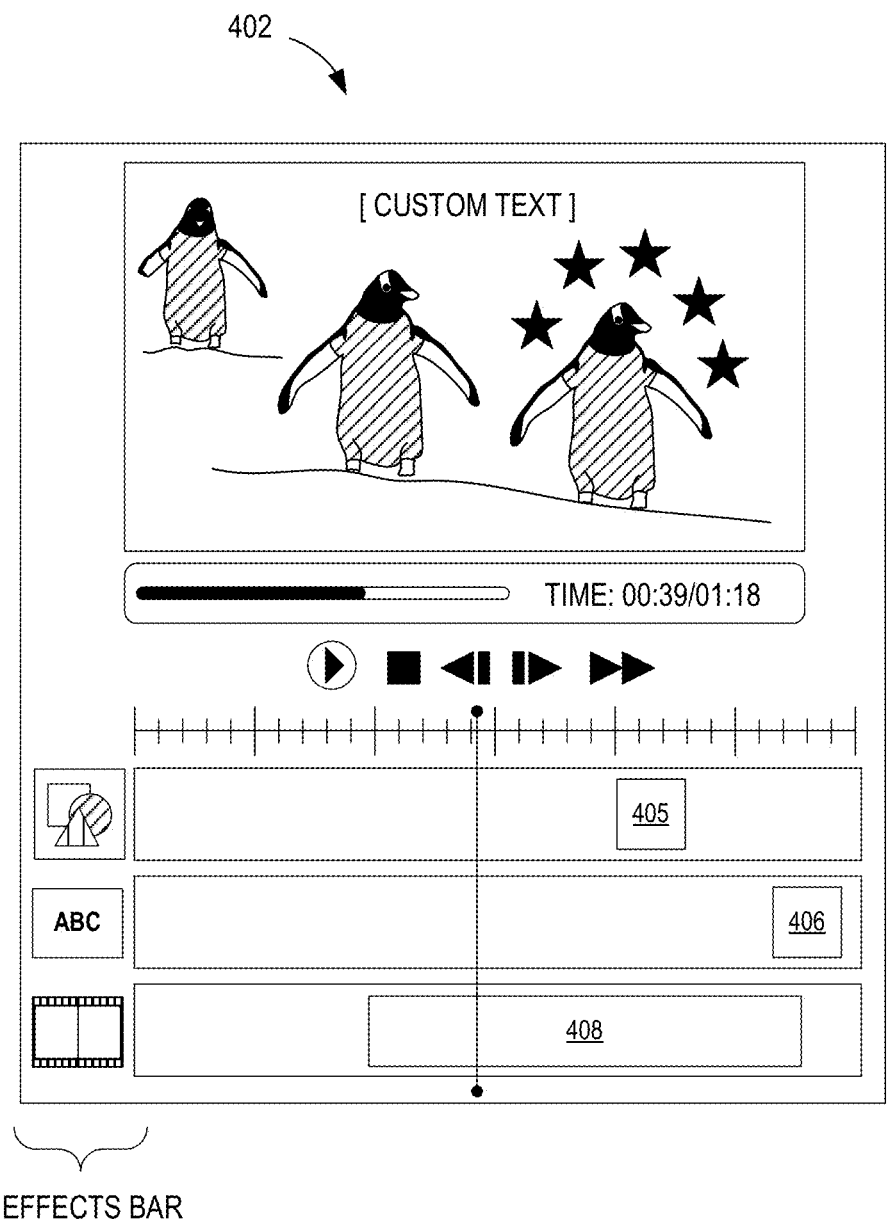
FIG. 4A depicts an example user interface generated by the user interface component in FIG. 1A for obtaining modifications from a user according to various embodiments of the present disclosure.
Figure 4B:
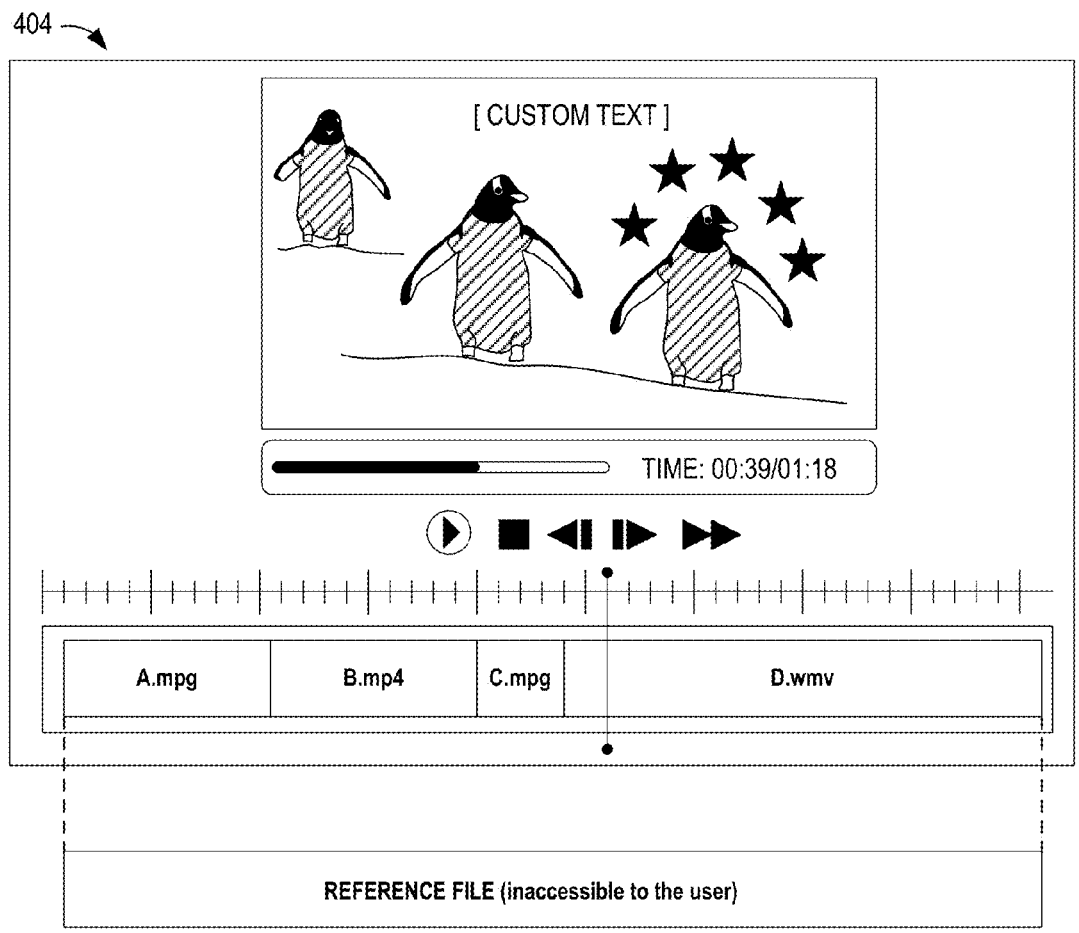
FIG. 4B depicts another example user interview generated by the user interface component in FIG. 1A where a video editing project is shown according to various embodiments of the present disclosure.

Reference is made to FIG. 4B, which depicts another example user interface 404 generated by the user interface component 114 in FIG. 1A where a video editing project is shown according to various embodiments of the present disclosure. In the example shown, a video editing project refers to video content edited by the user, where the video editing project comprises various video clips including A.mpg, B.mp4, C.mpg, and D.wmv, which may be viewed and edited further by the user via the UI 404. In this regard, a video editing project may comprise a series a video clips appended together.

The video editing project includes a plurality of segments, which may or may not coincide with a video clip. A segment may comprise, for example, a single video clip, a plurality of video clips, a portion of a video clip, a trimmed result of a video clip on the timeline, or other types of objects, such as text or other special effects. For some implementations, a user may utilize video editing software to edit videos by opening a video editing project. With newly created video project files, the user can import video clips, whereas with existing video project files, the user opens a video editing project and then views video clips, as illustrated in FIG. 4B.

In accordance with various embodiments, the assumption is made that the video editing project has been previously rendered, where the previously rendered video editing project may be used to generate a reference file. For some embodiments, a dialog box may be displayed to the user indicating the format in which the video editing project was previously rendered. For example, a dialog box may be displayed indicating to the user that the video editing project was previously rendered according to the H.264 format. For some embodiments, the user may then be given the opportunity to select a new format or verify that the previously-used format is acceptable. A video editing project is rendered to generate an output file. Note that a distinction between a video editing project and a reference file is that the reference file comprises a single file, such as "output1.mpg," where the individual video clips (A.mpg, B.mp4, C.mpg and D.wmv) are all rendered to generate output1.mpg (i.e., the output file), as shown in FIG. 4B. In accordance with various embodiments, the "reference file" comprises a copy of the output file and not merely a copy of a (pre-rendered) video editing project file. FIG. 4B further illustrates the timing associated with a reference file. Note that the reference file is not actually shown in a user interface 404 and is generally inaccessible to the user as the reference file is modified in the background.

For some embodiments, the user may specify the file path and/or the file name of the reference file, which is then utilized in accordance with the techniques disclosed herein. For some embodiments, the video editing system 102 (FIG. 1A) executes a validation mechanism for validating whether the user-designated reference file corresponds to the video editing project. Specifically, this mechanism validates whether the reference file is actually generated from the specific video editing project, otherwise the reference file cannot be utilized in conjunction with the selective rendering technique as the reference file does not correspond to the video editing project.

The validation mechanism in the video editing system 102 examines a tag and/or metadata embedded in the video editing project for purposes of validating the reference file. As shown, the reference file comprises various segments, where each of the segments may comprise a single video clip or a portion of a video clip where the video clips make up the video editing file in FIG. 4B.

Figure 5:
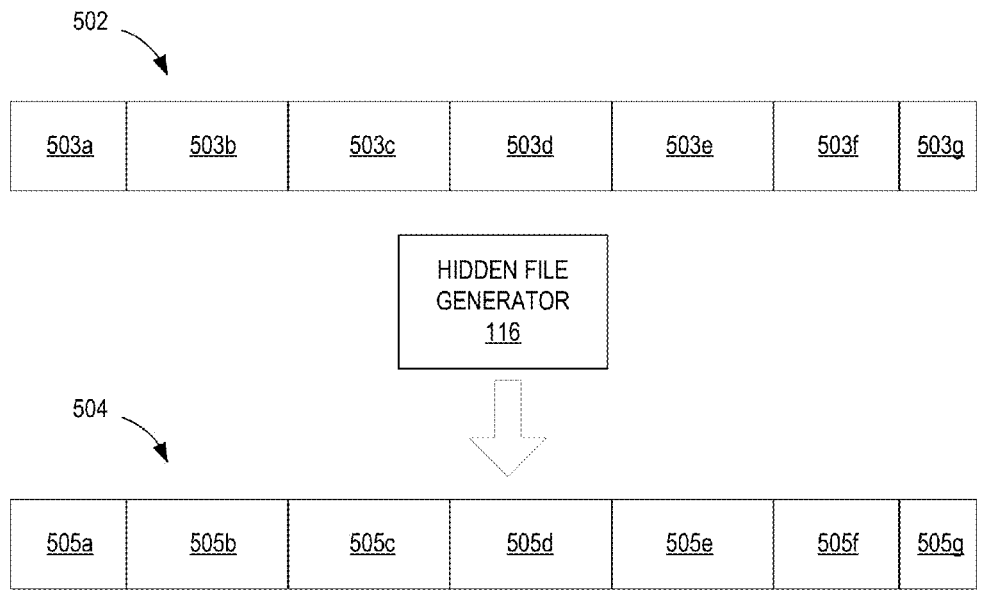
FIG. 5 illustrates the partitioning of media content into segments and the creation of a reference file according to various embodiments of the present disclosure.

As illustrated in the figures that follow, when the user modifies a segment (for example, a small portion of one of the video clips) of the video editing project, the reference file may identify a corresponding segment based on the timing information. Shown in FIG. 5 is a representation of a video editing project 502 being edited and a reference file 504 used for various embodiments of the selective rendering techniques disclosed. As shown, the video editing project 502 being edited may comprise a plurality of video clips having a plurality of segments 503*a-g*, where the video editing project 502 comprises the media content 115 (FIG. 1A) selected by the user for editing purposes. For some embodiments, the segments 503*a-g* are selected by the user using the video editing system 102 (FIG. 1A). Note that while each of the segments 503*a-g* may be equal in time duration, the segments 503*a-g* may also each differ in time duration.

In accordance with various embodiments, the hidden file generator 116 is configured to generate a reference file 504 comprising a copy of the video editing project 502 being edited. As shown, the reference file 504 comprises a rendered version of the video editing project 502, where the reference file 504 comprises a single file comprising content from the plurality of segments 505a-g. The user may elect to modify the video editing project 502 where one or more segments 503a-g are modified. As discussed above, a given segment 503a-g may or may not coincide with one of the video clips that collectively make up the video editing project 502. Again, a segment 503a-g may comprise a video clip, multiple video clips, or a portion of a video clip. For example, a user may wish to simply edit a segment 503a-g that comprises two seconds of video where the segment 503a-g lies within one of the video clips.

Figure 6:
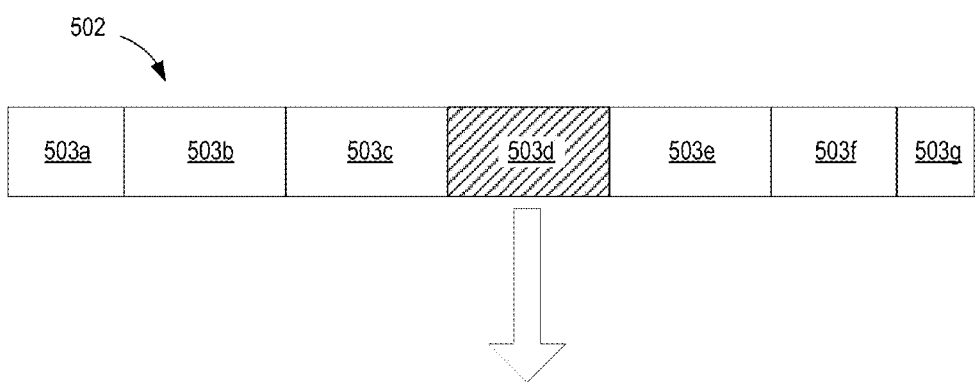
FIG. 6 illustrates the synchronization between the reference file and media file during the video editing process according to various embodiments of the present disclosure.
Figure 6:
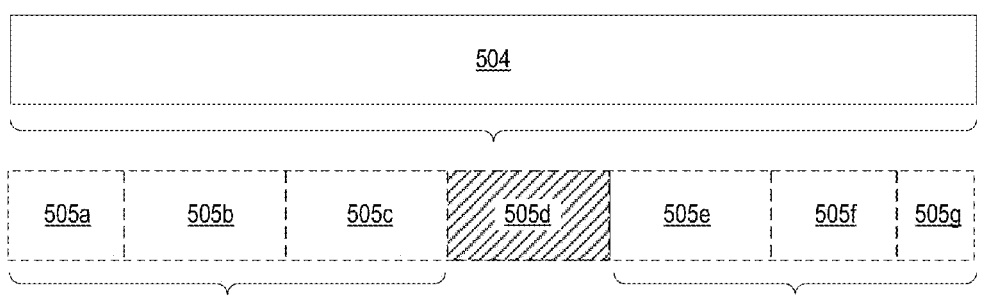

FIG. 6 illustrates how the reference file is synchronized with the video editing project 502 during the editing process. In the example shown, the user elects to modify a segment 503d in the video editing project 502, where the modification may comprise, for example, insertion of text and/or other special effects. In this example, the segment 503d being modified coincides with an entire video clip. However, as discussed above, a segment may comprise a portion of a video clip. Assume for this example that video clip (i.e., segment 503d) is the only segment being modified. Based on this, the corresponding segment 505d in the reference file 504 is modified such that the reference file 504 is synchronized with the video editing project 502. In this regard, the remaining segments (i.e., segments 505a-c, 505e-g) in the reference file 504 are reusable segments that do not need to be re-rendered by the render engine 130 (FIG. 1B), thereby accelerating the overall rendering operation.

Figure 7:
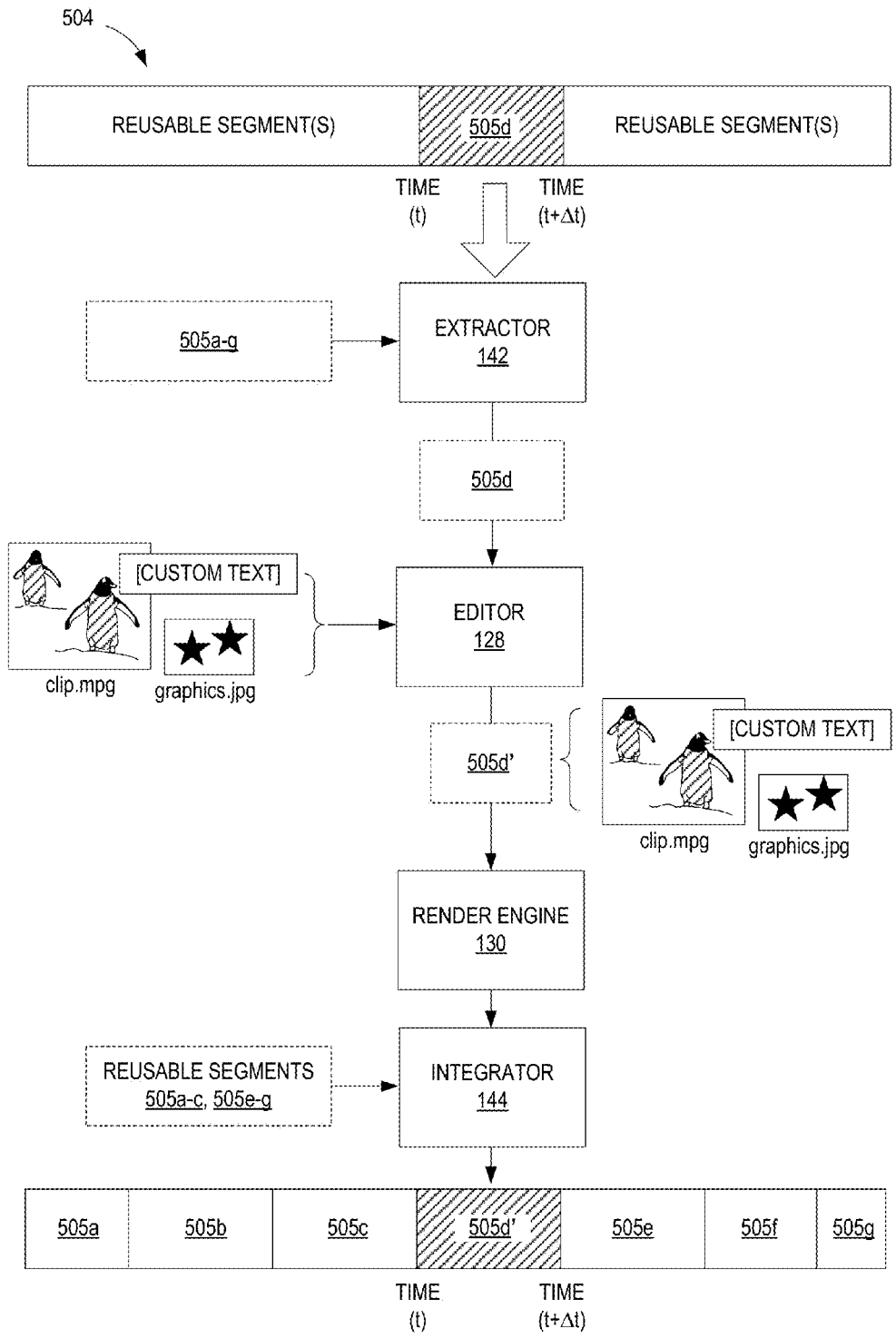
FIG. 7 illustrates the signal flow between the various components of the video editing device of FIG. 1A according to various embodiments of the present disclosure.

FIG. 7 illustrates the signal flow between the various components in the video editing device 102 (FIG. 1A). Referring back to the example of FIG. 6, assume that the user elects to modify a segment 503d comprising video clip in the video editing project 502. Based on this, the corresponding segment 505d in the reference file 504 is modified. Referring now to the top of FIG. 7, the timing information corresponding to the modification of the segment 503d comprising video clip in the video editing project 502 is captured and utilized to synchronize the modification of segment 505d. For example, the initial starting point in the video editing project 502 (time (t)) in which the user inserts graphics into the segment 503d is captured in addition to the duration of the special effect (Δt). This information may be embodied, for example, as time stamps and or timing parameters.

For some embodiments, the segment 505d in the reference file 504 being edited is extracted by the extractor 142 based on the captured time information. The editor 128 then applies the special effects specified by the user for the media file 102 to the extracted segment 505d. The special effects specified by the user may comprise, for example, the insertion of customized text, graphics, audio/video content from another file, and so on.

The render engine 130 then re-renders only the modified segment 505d with the special effects applied and outputs segment 505d' (the re-rendered version of segment 505d) for generating a file for playback purposes. The remaining video clips in the reference file 504 are reusable and therefore do not need to be re-rendered. (Note that this is based on the general assumption that the user does not wish to convert the entire file to another video format.)

The re-rendered segment 505d' is passed to the integrator 144, which then combines the re-rendered segment 505d' with the reusable segments 505a-c, 505e-g in the reference file 504. For some embodiments, the integrator 144 may be configured to insert the re-rendered segment 505d' back into the reference file 504 based on the captured timing information referenced above. The output file generated by the integrator 144 is then presented to the user for playback or for further editing. Note that for some embodiments, the reference file 504 is hidden from the user during the editing, extracting, and integration operations.

Figure 8:
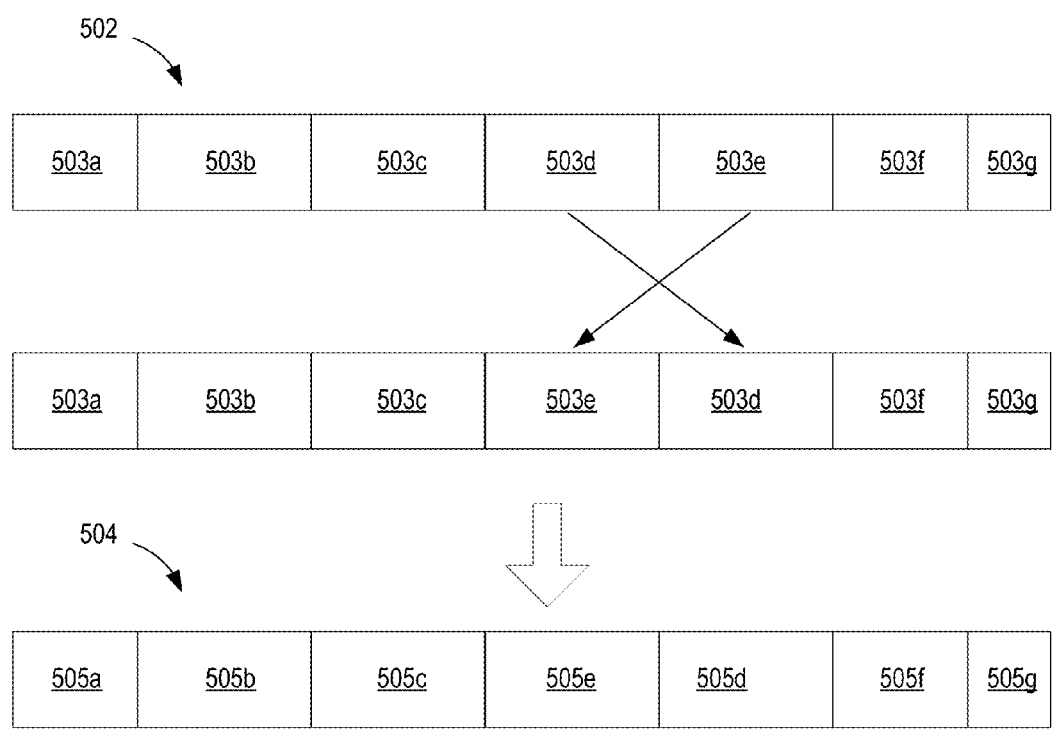
FIG. 8 illustrates one type of modification where re-rendering by the render engine of FIG. 1B may be bypassed according to various embodiments of the present disclosure.

Reference is made to FIG. 8, which illustrates a scenario in which no re-rendering is needed where the modification by the user comprises re-ordering or re-positioning of video clips within the video editing project 502. In the example shown, the user wises to merely swap the positioning of two segments 503d, 503e comprising video clips in the video editing project 502. In the reference file 504, the corresponding segments 505d, 505e are swapped accordingly. However, no re-rendering is needed as the segments 505a-g are otherwise unaffected. In this regard, the rendering operation performed by the render engine 130 may be bypassed and an output file with the swapped segments 505d, 505e may be created.

Figure 9:
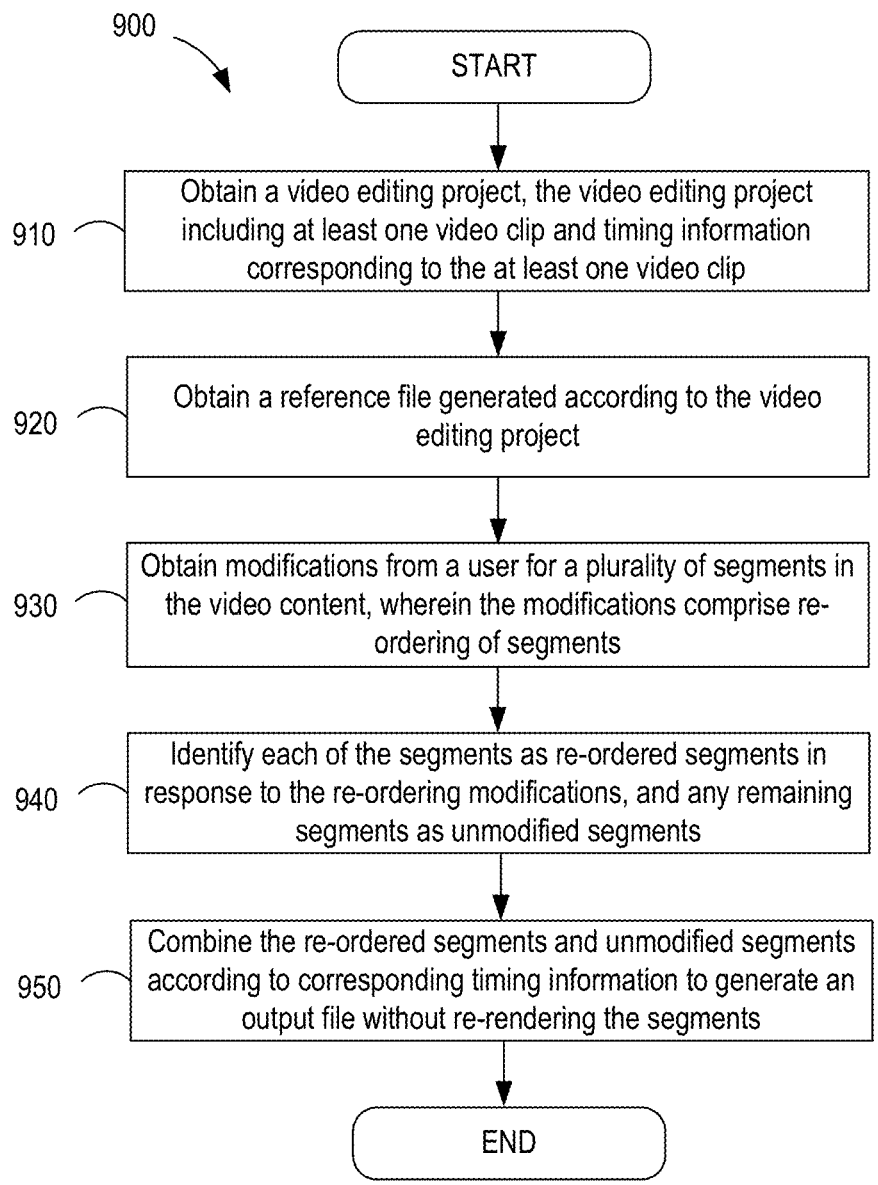
FIG. 9 is a top-level flowchart illustrating examples of other functionality implemented as portions of the video editing system of FIG. 1A for facilitating selective rendering during video editing according to various embodiments of the present disclosure.

Reference is made to FIG. 9, which is a flowchart 900 in accordance with one embodiment for facilitating selective rendering of video content performed by the video editing system 102 of FIG. 1A. It is understood that the flowchart 900 of FIG. 9 provides merely an example of the many different types of functional arrangements that may be employed to implement the operation of the various components of the video editing system 102 (FIG. 1A). As an alternative, the flowchart of FIG. 9 may be viewed as depicting an example of steps of a method implemented in the video editing system 102 according to one or more embodiments.

Although the flowchart 900 of FIG. 9 shows a specific order of execution, it is understood that the order of execution may differ from that which is depicted. For example, the order of execution of two or more blocks may be scrambled relative to the order shown. Also, two or more blocks shown in succession in FIG. 9 may be executed concurrently or with partial concurrence. It is understood that all such variations are within the scope of the present disclosure.

The flowchart 900 in FIG. 9 corresponds to a scenario in which no re-rendering is needed where the modification by the user comprises re-ordering or re-positioning of segments within the video editing project 502 (FIG. 8). Beginning with block 910, a video editing project 502 to be edited is obtained by the media processor 116 (FIG. 1A). For some embodiments, the video editing project includes at least one video clip and timing information corresponding to the at least one video clip.

In block 920, the reference file generator 126 (FIG. 1B) generates a reference file according to the video editing project. In block 930, the user interface component 114 (FIG. 1A) obtains modifications from a user for a plurality of segments in the video content, wherein the modifications comprise re-ordering of segments.

In block 940, the editor 128 (FIG. 1B) identifies each of the segments as re-ordered segments in response to the re-ordering modifications, and the remaining segments as unmodified segments, where segments are rearranged/reordered, as illustrated earlier in FIG. 8. In block 950, the editor 128 combines the re-ordered segments and unmodified segments according to corresponding timing information to generate an output file without re-rendering the segments.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method of editing a video, comprising:
    obtaining a video editing project, the video editing project including at least one video clip appended together and timing information corresponding to the at least one video clip, each of the at least one video clip comprising a plurality of previously-rendered segments;
    obtaining a reference file generated according to the video editing project;
    obtaining modifications to the video editing project from a user for a plurality of segments in the at least one video clip, wherein the modifications comprise re-ordering of segments in a same video clip of the video editing project;
    determining that no re-rendering is needed responsive to the obtained modifications comprising re-ordering of segments;
    identifying each of the segments associated with the modifications as re-ordered segments, and any remaining segments as unmodified segments; and
    combining the re-ordered segments of the reference file with unmodified segments of the reference file according to corresponding timing information to generate an output file, wherein combining is performed without re-rendering the previously-rendered segments.

2. The method of claim 1, wherein the reference file is updated according to the output file.

3. The method of claim 1, further comprising:
    responsive to the modification to the video editing project comprising re-ordering of segments, re-ordering corresponding segments in the reference file, wherein re-ordering is performed without re-rendering the reference file.

4. The method of claim 1, wherein extracting corresponding segments from the reference file is performed based on timing information corresponding to the modifications in the video content.

5. The method of claim 1, wherein the reference file is hidden from the user, and wherein the output file is accessible by the user.

6. A method of editing a video, comprising:
    obtaining a video editing project, the video editing project comprising a plurality of video clips appended together and corresponding timing information for each video clip, wherein each video clip comprises a plurality of previously-rendered segments;
    obtaining a reference file generated according to the video editing project;
    obtaining modifications to the video editing project from a user for a plurality of segments in at least one of the video clips, wherein the modifications comprise re-ordering of segments in the at least one of the video clips of the video editing project;
    identifying each of the segments associated with the modifications as re-ordered segments and any remaining segments as unmodified segments; and
    combining the re-ordered segments of the reference file and with unmodified segments of the reference file according to corresponding timing information to generate an output file, wherein combining is performed without re-rendering the previously-rendered segments.

7. The method of claim 6, wherein the reference file is inaccessible to the user.

8. The method of claim 6, further comprising generating a user interface displaying a representation of the video editing project displayed relative to a timeline component, the user interface further displaying representations of the plurality of video clips.

9. the method of claim 6, further comprising saving a copy of the output file as the reference file upon generation of the output file.

* * * * *